L. C. NORTON.
TRANSMISSION GEARING.
APPLICATION FILED SEPT. 28, 1908.
942,406.
Patented Dec. 7, 1909.
2 SHEETS—SHEET 1.
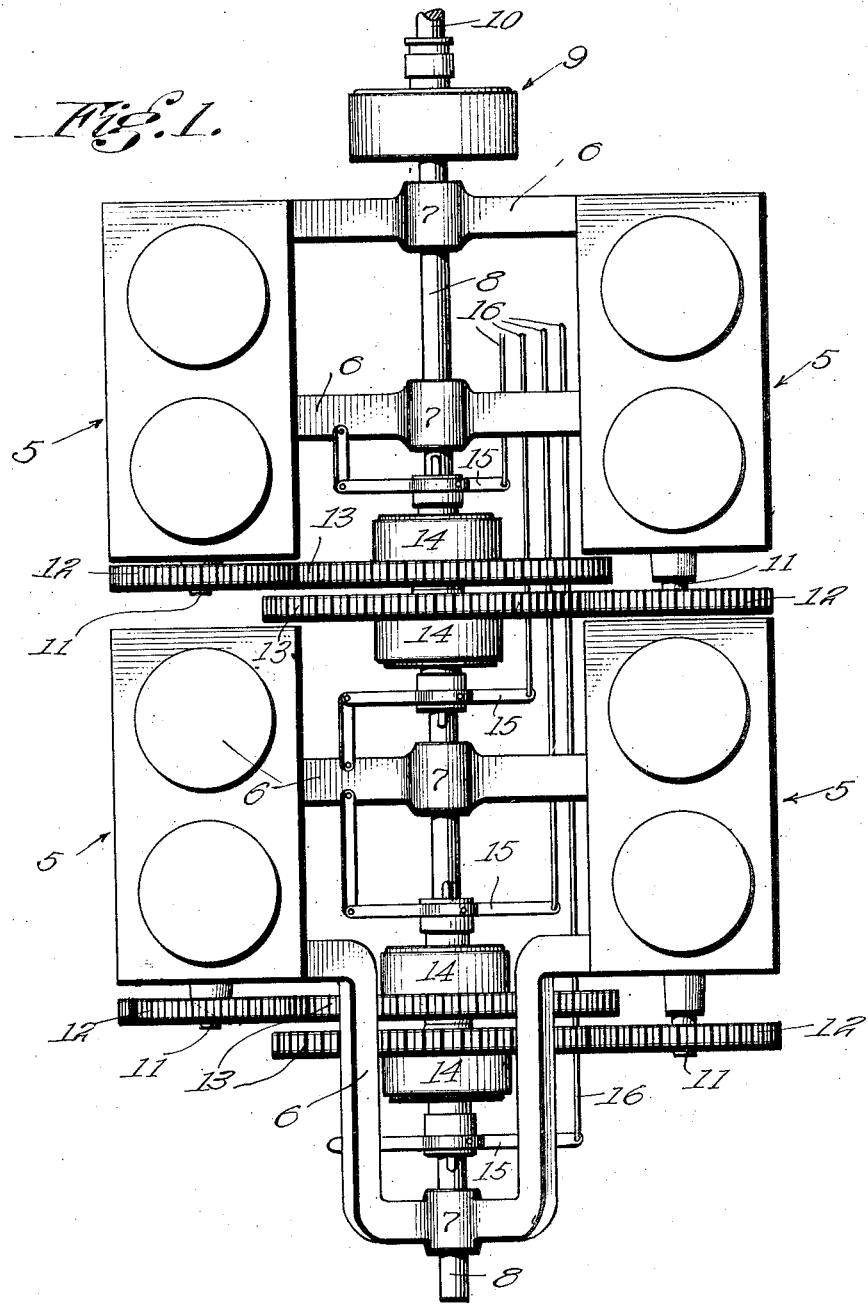

L. C. NORTON.
TRANSMISSION GEARING.
APPLICATION FILED SEPT. 28, 1908.
942,406.
Patented Dec. 7, 1909.
2 SHEETS—SHEET 2.
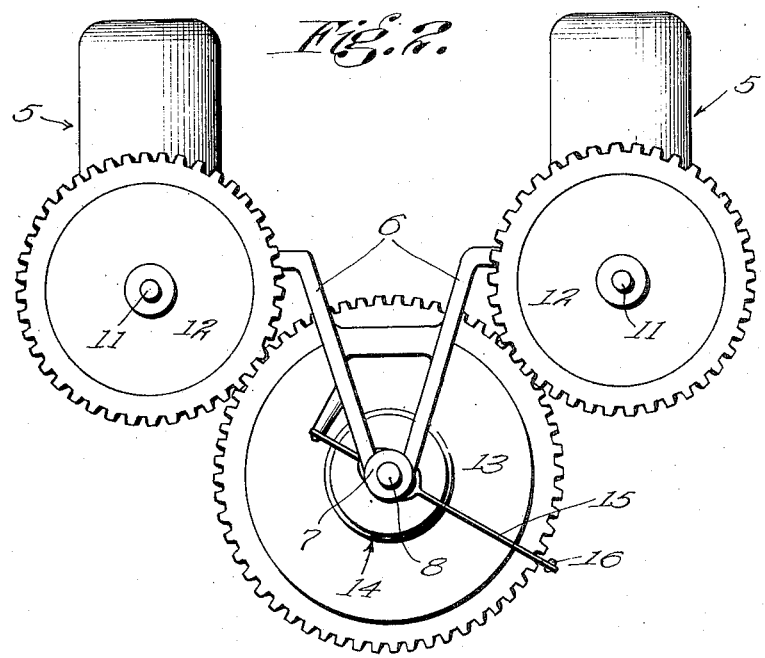
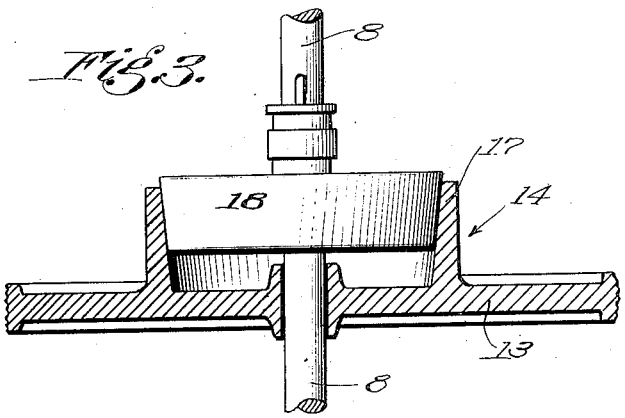
Witnesses
James T. Barkelew
Ollie Palmer
Inventor
Lemuel C. Norton
By Hazard & Krause
Attorneys.

UNITED STATES PATENT OFFICE.

LEMUEL C. NORTON, OF LOS ANGELES, CALIFORNIA.

TRANSMISSION-GEARING.

942,406.

Specification of Letters Patent.

Patented Dec. 7, 1909.

Application filed September 28, 1908. Serial No. 454,979.

*To all whom it may concern:*

Be it known that I, LEMUEL C. NORTON, a citizen of the United States, residing at Los Angeles, in the county of Los Angeles and State of California, have invented new and useful Improvements in Transmission-Gearing, of which the following is a specification.

This invention relates to a power transmission mechanism particularly adapted for automobile use in connection with a plurality of engines.

A basic object of my invention is to provide a device whereby I am enabled to employ as many engines as may be desired to produce the power needed under varying conditions, thus resulting in a great saving of fuel.

By the use of my improved form of power transmission mechanism I am enabled when operating along level stretches of highways to employ the minimum number of engines to propel the machine at the desired speed, and when ascending steep hills the full number may be employed to give the machine the required power to ascend the hill, some of the engines being immediately cut out when the machine reaches the summit, thus greatly economizing in the use of fuel.

In its preferred form the invention consists of a central main shaft around which the units are preferably arranged. Each of the units is connected through a gear train and a clutch to the main shaft, the clutch being operable to throw the different engines into and out of service as is desired. The arrangement of the engines may be varied to suit the needs of any particular case, typical arrangement alone being shown in the drawings.

I accomplish the above objects by means of the device described herein and illustrated in the accompanying drawings in which:—

Figure 1,— is a plan view of an engine of four units arranged with my improved transmission gear. Fig. 2,— is a front end elevation of the same. Fig. 3,— is a detail showing a typical form of clutch used in connection with the transmission mechanism.

In the drawings 5 designates a plurality of engines, each consisting of two explosion cylinders and the other necessary operating parts. Engines 5 are connected by a frame 6 which is formed in any suitable manner and is provided with bearings 7 for the journaling of main shaft 8. This main shaft extends a slight distance forward for the reception of the usual starting crank and is provided at its rear end with a clutch connection 9 to transmission shaft 10 which is connected to the driving wheels of the automobile. On each of the engine shafts 11 is mounted a gear 12 which meshes with a gear 13 loosely mounted on main shaft 8. Each of gears 13 is provided with a friction clutch connection 14 with main shaft 8, these clutches being operated through the medium of a lever 15 and a connecting rod 16. These connecting rods may extend to any desired point so that the clutches may be evenly operated from a hand lever or levers on the body of the car and within convenient reach of the driver. The clutches may be of any approved form, a typical form being shown in Fig. 3 comprising two conical members 17 and 18 adapted to be moved into engagement with each other by the operation of lever 15.

As an automobile is usually equipped with sufficient power to travel over heavy roads and steep grades it is apparent that the full amount of power is not needed in traveling over roads having good surfaces. With my device one or more of the engines may be cut out of service while the car is being propelled over such a road, a great saving being thus effected in fuel consumption and general maintenance. When it is desired to start one of the other engines it is only necessary to throw the clutch for that engine into engagement and the engine will be started by the rotation of the main shaft. The starting engine will then begin to develop power and aid in the propulsion of the automobile.

From the foregoing description it will be seen that the present invention embodies the arrangement of a number of engines in such a relation to a main shaft that they may be conveniently thrown into and out of operation. Although this arrangement is particularly applicable to explosion engines as used in automobile construction it is not at all limited to that use and may be used for many other purposes.

I claim,

1. In a transmission gearing, the combination of a main transmission shaft, a clutch member thereon, a second shaft, a clutch member thereon adapted to engage with the clutch member on said first named shaft, a plurality of engines provided with crank shafts, and transmission means between said engine shafts and said main shaft.

2. In a transmission gearing, the combination of a main transmission shaft, a clutch member thereon, a second transmission shaft, a clutch member thereon adapted to engage with the clutch member on said main shaft, a plurality of motors, and transmission means mounted between said motors and said main shaft.

3. In a transmission gearing, the combination of a main transmission shaft, a friction clutch member thereon, a second transmission shaft, a friction clutch member thereon adapted to engage the clutch member on said main shaft, a plurality of motors, and transmission means between said motors and said main shaft.

4. In a transmission gearing, the combination of a main transmission shaft, a friction clutch member thereon, a second transmission shaft, a friction clutch member thereon adapted to engage the clutch member on said main shaft, a plurality of motors, and transmission means between said motors and said main shaft, said transmission means including a plurality of friction clutches.

5. In a transmission gearing, the combination of a main transmission shaft, a clutch member thereon, a second transmission shaft, a clutch member thereon adapted to engage the clutch member on said main shaft, a plurality of motors, and gear transmission means between said motors and said main shaft.

In witness that I claim the foregoing I have hereunto subscribed my name this 21st day of September, 1908.

LEMUEL C. NORTON.

Witnesses:
EDMUND A. STRAUSE,
OLLIE PALMER.